US012625244B2

(12) United States Patent
Singh et al.

(10) Patent No.: US 12,625,244 B2
(45) Date of Patent: May 12, 2026

(54) TARGET DETECTION USING A PLURALITY OF TRANSCEIVERS

(71) Applicant: Infineon Technologies AG, Neubiberg (DE)

(72) Inventors: Ajinder Pal Singh, Allen, TX (US); Daniel Lee, Salt Lake City, UT (US); Kameswara Medapalli, Saratoga, CA (US); Cecilia Carbonelli, Munich (DE)

(73) Assignee: Infineon Technologies AG, Neubiberg (DE)

( * ) Notice: Subject to any disclaimer, the term of this patent is extended or adjusted under 35 U.S.C. 154(b) by 4 days.

(21) Appl. No.: 18/657,061

(22) Filed: May 7, 2024

(65) Prior Publication Data
US 2025/0347794 A1     Nov. 13, 2025

(51) Int. Cl.
| | |
|---|---|
| *G01S 13/04* | (2006.01) |
| *G01S 7/41* | (2006.01) |
| *G01S 13/00* | (2006.01) |
| *G01S 13/02* | (2006.01) |

(52) U.S. Cl.
CPC .............. *G01S 13/04* (2013.01); *G01S 7/415* (2013.01); *G01S 13/003* (2013.01); *G01S 13/0209* (2013.01)

(58) Field of Classification Search
CPC .... G01S 13/04; G01S 13/003; G01S 13/0209; G01S 7/415
See application file for complete search history.

(56) References Cited

U.S. PATENT DOCUMENTS

| | | | | |
|---|---|---|---|---|
| 12,103,547 | B2 * | 10/2024 | Salter | ........................ G06T 7/74 |
| 2020/0278438 | A1 * | 9/2020 | Huang | ..................... G01S 7/038 |
| 2020/0309932 | A1 * | 10/2020 | Zeng | ........................ G07C 5/08 |
| 2023/0209493 | A1 * | 6/2023 | Lim | ...................... H04W 64/00 |
| | | | | 455/456.1 |
| 2024/0241241 | A1 * | 7/2024 | Salter | ...................... G01S 13/88 |
| 2024/0425005 | A1 * | 12/2024 | Velusamy | ............. B60R 16/037 |

OTHER PUBLICATIONS

Dingyang Wang et al. "Experimental Comparison of IR-UWB Radar and FMCW Radar for Vital Signs." Published Nov. 23, 2020.
Dieter Coppens et al. "An Overview of UWB Standards and Organizations (IEEE 802.15.4, FiRa, Apple): Interoperability Aspects and Future Research Directions."

* cited by examiner

*Primary Examiner* — Tan Q Nguyen
(74) *Attorney, Agent, or Firm* — Eschweiler & Potashnik, LLC

(57)     ABSTRACT
Some aspects of the present disclosure relate to a detection system having a plurality of wide-band transceivers and a controller circuitry communicatively connected to each of the transceivers. Each transceiver comprises a transmitter and a receiver. The controller circuitry is configured to trigger a subset of the transmitters to transmit a first set of signals for receipt by a subset of the receivers, establish a baseline channel-impulse-response (CIR) profile for the system based on the receipt of the first set of signals, subsequently trigger the subset of the transmitters to transmit a second set of signals for receipt by the subset of the receivers, establish a first current CIR profile for the system based on the receipt of the second set of signals, and detect a non-transmitting target in proximity to the system based on the baseline CIR profile and the first current CIR profile.

21 Claims, 5 Drawing Sheets

100

201(4) 202 201(1)

201(3)

201(5) 201(2)

210 211

200

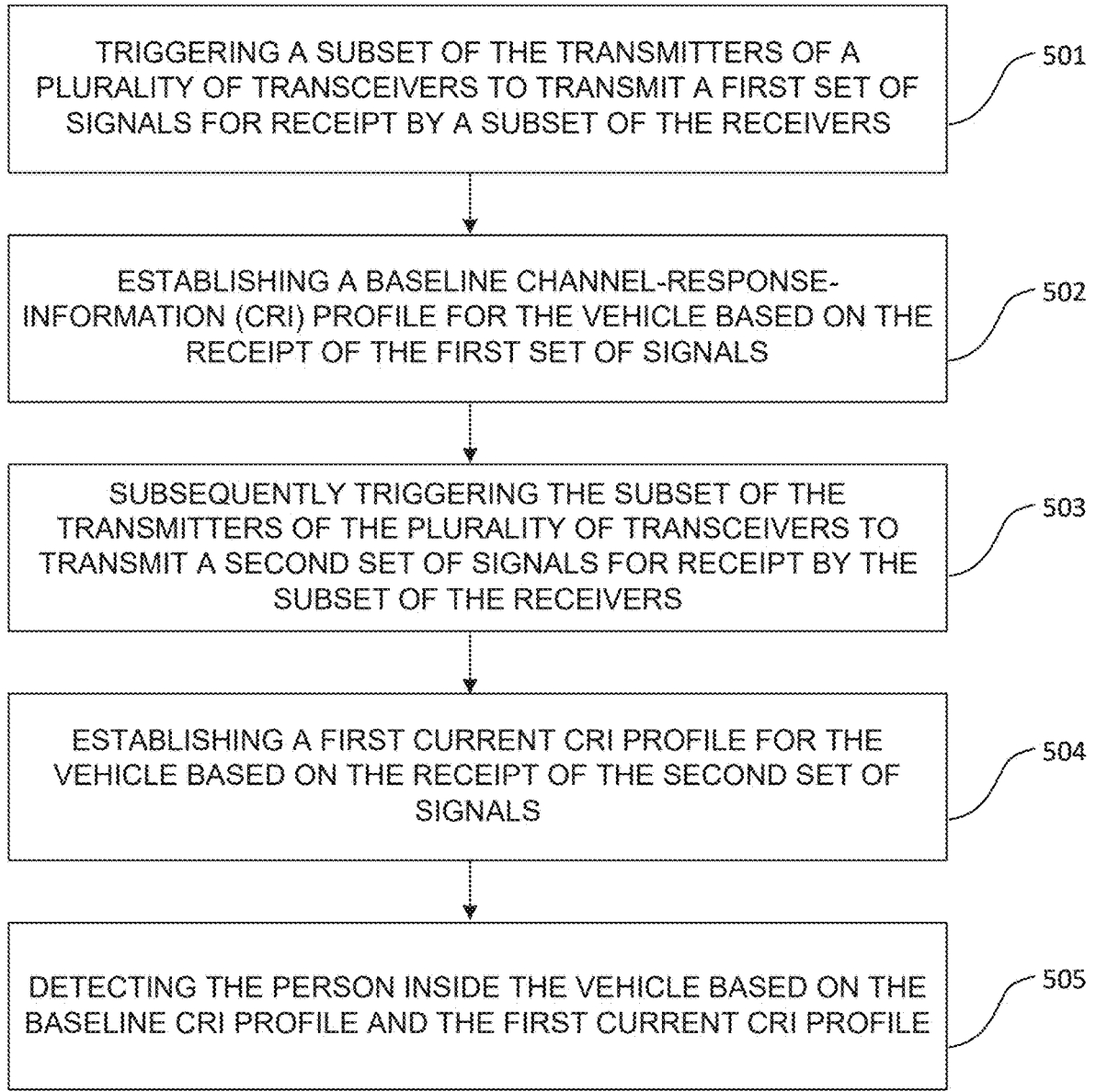

TRIGGERING A SUBSET OF THE TRANSMITTERS OF A PLURALITY OF TRANSCEIVERS TO TRANSMIT A FIRST SET OF SIGNALS FOR RECEIPT BY A SUBSET OF THE RECEIVERS — 501

ESTABLISHING A BASELINE CHANNEL-RESPONSE-INFORMATION (CRI) PROFILE FOR THE VEHICLE BASED ON THE RECEIPT OF THE FIRST SET OF SIGNALS — 502

SUBSEQUENTLY TRIGGERING THE SUBSET OF THE TRANSMITTERS OF THE PLURALITY OF TRANSCEIVERS TO TRANSMIT A SECOND SET OF SIGNALS FOR RECEIPT BY THE SUBSET OF THE RECEIVERS — 503

ESTABLISHING A FIRST CURRENT CRI PROFILE FOR THE VEHICLE BASED ON THE RECEIPT OF THE SECOND SET OF SIGNALS — 504

DETECTING THE PERSON INSIDE THE VEHICLE BASED ON THE BASELINE CRI PROFILE AND THE FIRST CURRENT CRI PROFILE — 505

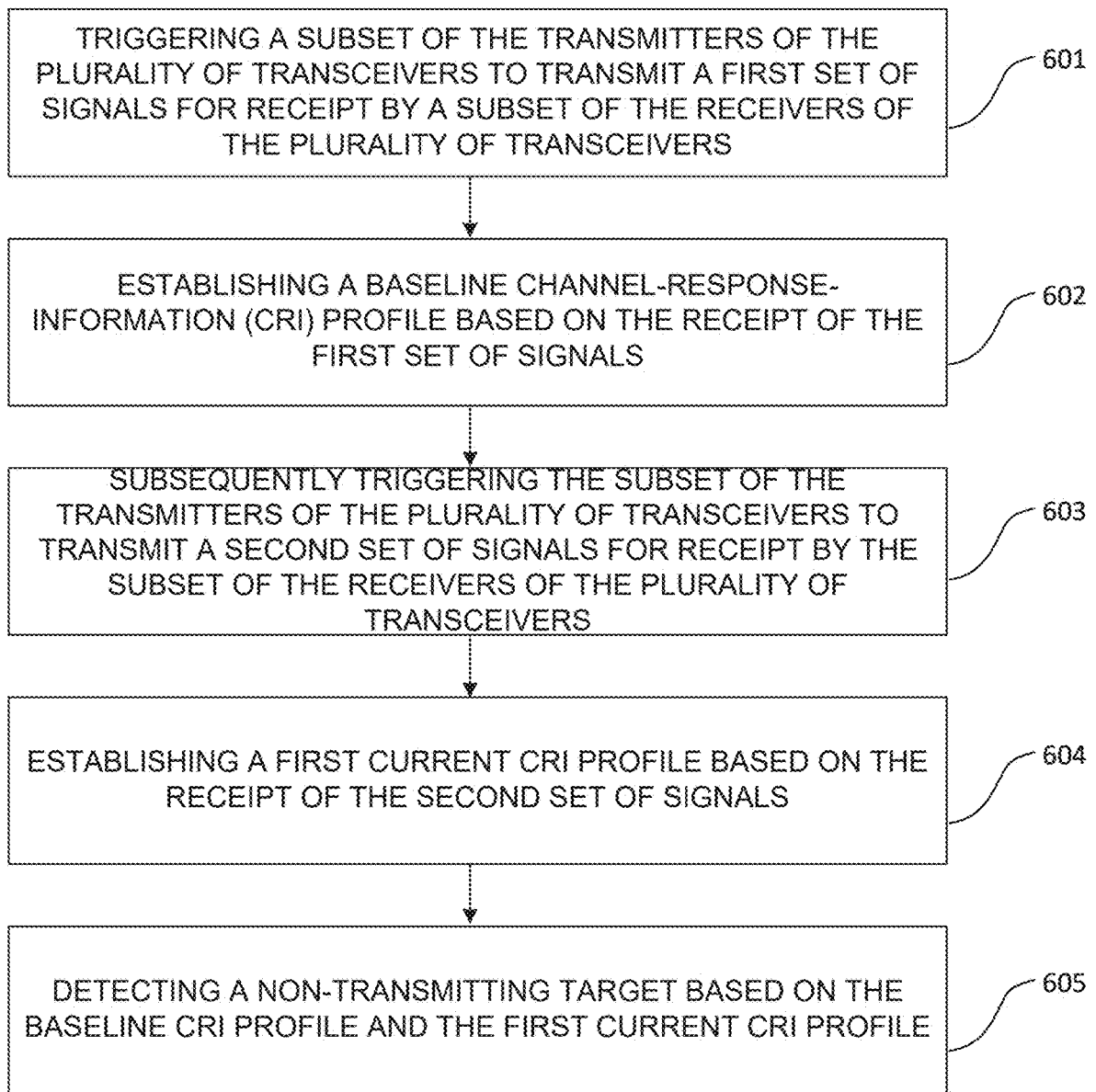

601 TRIGGERING A SUBSET OF THE TRANSMITTERS OF THE PLURALITY OF TRANSCEIVERS TO TRANSMIT A FIRST SET OF SIGNALS FOR RECEIPT BY A SUBSET OF THE RECEIVERS OF THE PLURALITY OF TRANSCEIVERS

602 ESTABLISHING A BASELINE CHANNEL-RESPONSE-INFORMATION (CRI) PROFILE BASED ON THE RECEIPT OF THE FIRST SET OF SIGNALS

603 SUBSEQUENTLY TRIGGERING THE SUBSET OF THE TRANSMITTERS OF THE PLURALITY OF TRANSCEIVERS TO TRANSMIT A SECOND SET OF SIGNALS FOR RECEIPT BY THE SUBSET OF THE RECEIVERS OF THE PLURALITY OF TRANSCEIVERS

604 ESTABLISHING A FIRST CURRENT CRI PROFILE BASED ON THE RECEIPT OF THE SECOND SET OF SIGNALS

605 DETECTING A NON-TRANSMITTING TARGET BASED ON THE BASELINE CRI PROFILE AND THE FIRST CURRENT CRI PROFILE

TARGET DETECTION USING A PLURALITY OF TRANSCEIVERS

BACKGROUND

Progressing automotive technology has seen the introduction into automobiles of various computing and sensing systems designed to address particular corresponding perceived needs. For example, microphones are used to assist in driver communication by allowing for hands-free telephone calls and provision of vocalized instructions to an automobile's information and entertainment systems. Tire-pressure monitoring systems, for example, measure and transmit tire pressure information and provide an alert if any tires are under-inflated. As further examples, outward-facing cameras, ultrasonic, radar, and other sensor systems are used to assist drivers in tasks such as parking, lane maintenance, and general driving, while global positioning system (GPS) sensors are used to provide navigation information. As an additional example, ultra-wideband (UWB) systems are used in authenticating UWB-transmitting key fobs to allow automatic locking and unlocking and engine start and stop.

BRIEF DESCRIPTION OF THE DRAWINGS

Some examples of circuits, apparatuses and/or methods will be described in the following by way of example only. In this context, reference will be made to the accompanying Figures.

FIG. 5 shows a flowchart for an example procedure for the UWB system 200 of FIG. 2.

FIG. 6 shows a flowchart for an example procedure in accordance with an embodiment of the disclosure.

DETAILED DESCRIPTION

Figure 1:
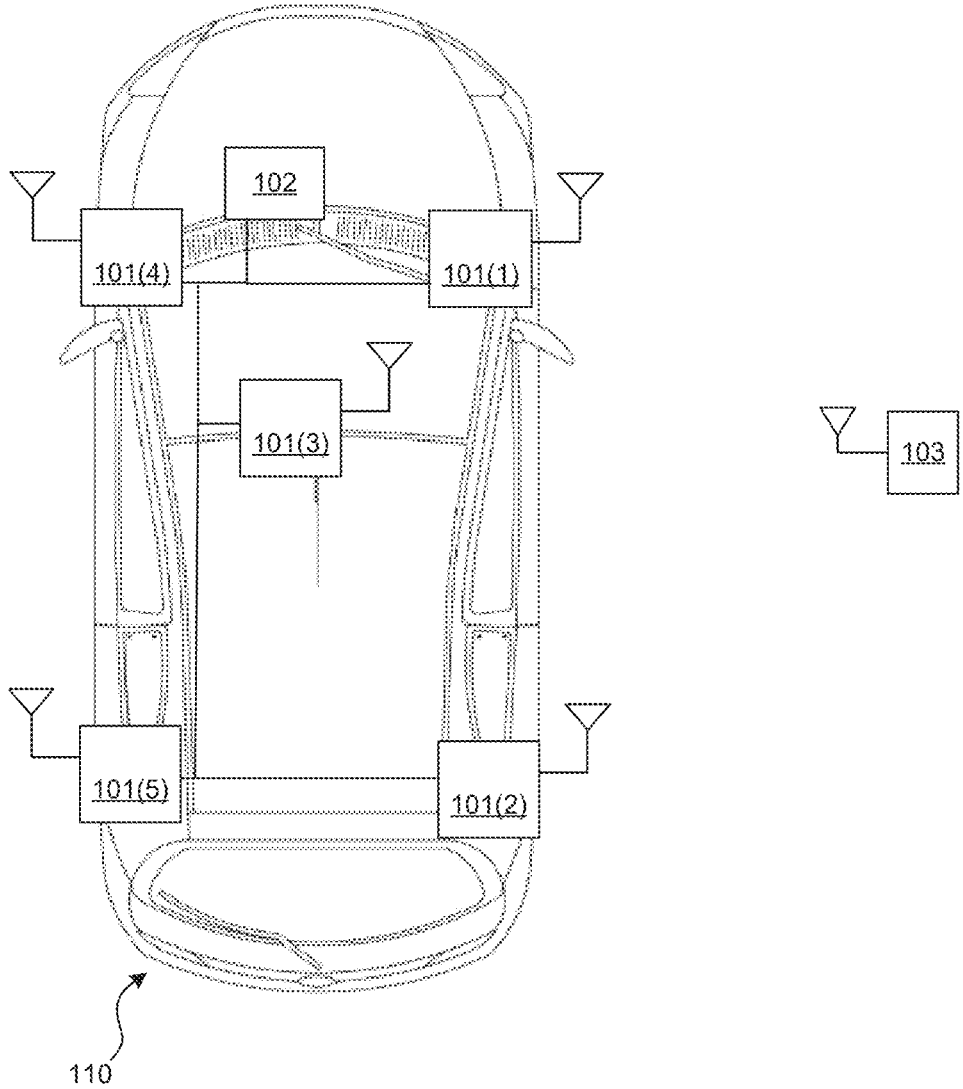
FIG. 1 illustrates an example automotive UWB system.

The present disclosure will now be described with reference to the attached drawing figures, wherein like reference numerals are used to refer to like elements throughout, and wherein the illustrated structures and devices are not necessarily drawn to scale.

Impulse-Radio Ultra-Wide-Band (IR-UWB) refers to a low-power wireless near-field communication technology that uses numerous very short and narrow radio-frequency electromagnetic pulses transmitted over a wide frequency band. Typically, the transmitted pulses are shorter than 2 ns, the transmit power is limited to −41.3 dBm/MHz, and the corresponding bandwidth is in the neighborhood of 500 MHz or more. In addition to being useful for communication and sensing, the shortness and narrowness of the transmitted pulses also allow for an accurate calculation of distances between transceivers by, for example, using two-way ranging.

Two way ranging involves calculating a time-of-flight (ToF) for transmitted messages based on tracking message receipt, transmission, and processing times for the two transceivers. One of the two transceivers may be designated as an anchor and the other may be designated as a tag.

Generally, the more-fixed transceiver would be designated as the anchor. However, the designations may be dynamic such that, for example, where both transceivers are implemented in mobile devices, the anchor and tag designations may alternate between the two transceivers during the two-way ranging procedure. The distance between a tag and an anchor may be determined by multiplying the calculated time of flight (typically lasting no more than a few nanoseconds) by the speed of light ($\sim 3 \times 10^8$ m/s).

Some automotive UWB systems utilize multiple UWB anchor transceivers (a.k.a. anchors) located in respective fixed locations in an automobile to calculate respective distances to a UWB tag such as a key fob. The UWB system can use the calculated distance information to determine the location of the key fob, using, e.g., trilateration, which refers to localization based on calculating an intersection of circles centered on respective anchors. The UWB system may then provide corresponding automotive functionality based on the determined location of the tag—e.g., locking and/or unlocking the driver door or trunk or enabling and/or disabling a motor start. Typically, prior to the provision of automotive functionality, the key fob is first securely verified using an authentication protocol. The authentication protocol may use one or more UWB anchors or may instead, or in addition, use other wireless communication technologies such as, for example, Bluetooth (a registered trademark of Bluetooth SIG, Inc.).

FIG. 1 illustrates an example automotive UWB system 100 that includes a UWB tag transceiver 103 and an automobile 110 that includes a plurality of UWB anchor transceivers 101, namely anchors 101(1)-101(5), which are communicatively connected to a controller 102. The controller 102 may, for example, be circuitry implemented in an engine control unit (ECU) integrated circuit and may include a digital signal processor (DSP) as well as an artificial-intelligence (AI) accelerator or other suitable module for running machine-learning models. If the tag 103 is within range of the automobile 110, then a set of the plurality of UWB anchors 101—e.g., anchors 101(1), 101(2), and 101 (3)—may be used by the controller 102 to determine the location of the tag 103 by, for example, trilateration, which may involve calculating the respective distances from the tag 103 to each of the anchors 101 in the set and then determining an intersection of correspondingly sized circles around each of the anchors 101 of the set. Notably, this implementation does not require synchronizing clocks among the anchors 101 as the distance from the tag 103 to each anchor 101 of the set is independently determined by the respective anchor 101.

Each anchor 101 comprises one or more antennas for transmitting and/or receiving signals, wherein each antenna may be located inside or outside the cabin of automobile 110. An anchor 101 may also comprise a set of antennas where some are inside the cabin and some are outside. For example, anchors 101 located at or near the body shell of the automobile 110, such as anchors 101(1), 101(2), 101(4), and 101(5), may comprise at least a first antenna located inside the cabin, for cabin communication and/or sensing, and a second antenna located outside the cabin, for external communication and/or sensing. The first antenna may be located in the body of the anchor while the second antenna may be connected to the body of the anchor with a conductive wire through an opening in the body shell or corresponding body panel. The controller 102 can select particular subsets of interior and/or exterior antennas of the set of anchors 101 for particular corresponding communication or sensing operations.

In one alternative implementation, where a plurality of anchors 101 are clock synchronized and each anchor 101 time stamps a received message from the tag 103 and provides corresponding message information to the controller 102, then the controller 102 can calculate the location of the tag based on the time differences of arrival (TDoA) of the message from the tag at the various anchors 101. In another alternative implementation, where each anchor 101 of a set of the plurality of anchors comprises two or more receiver antennas, each of those multi-receiver-antenna anchors 101 can use phase differences at each antenna of the message received from the tag 103 to calculate an angle of arrival (AoA) for the message received from the tag 103, along with the corresponding distance to the tag 103. The controller 102 can use the distance and AoA information from two or more anchors 101 to determine the location of the tag 103.

Note that anchors 101 that comprise multiple receivers or transmitters may be referred to as advanced anchors and may be characterized as T×R transceivers where T>1 and/or R>1 (e.g., 2×3 or 2×4). Relatedly, anchors 101 that comprise only one transmitter and one receiver may be referred to as basic anchors and may be characterized as 1×1 transceivers. Basic anchors are generally less expensive than advanced anchors. Note also that each transmitter and receiver may have a corresponding physical antenna element or, alternatively, one or more transmitters and receivers may share a physical antenna, where a switch selectively connects the physical antenna to the selected transmitter or receiver. Each anchor 101 and/or the controller 102 may include a packaged integrated circuit (IC) including semiconductor devices arranged on a semiconductor substrate, such as, for example, a silicon substrate, germanium arsenide substrate, or other suitable semiconductor substrate. In some cases, each anchor 101 may include multiple ICs that are stacked and/or packaged in a so-called three-dimensional IC (3D-IC), or which can be coupled to one another via conductive traces on a printed circuit board. The anchors 101 and/or controller 102 can be coupled to one another via copper wires, coaxial cables, optical cables, and/or wireline cabling, and/or can be coupled wirelessly to one another.

The UWB system 100 may attempt to determine the location of the tag 103 periodically at some preset time intervals, intermittently based on some automatic calculation, in response to particular triggers, or on any other suitable basis. Multiple distance determinations can be used to determine motion of the tag 103. As the determined location of the tag 103 changes, the controller 102 can take corresponding actions. For example, if the tag 103, presumably in the possession of a driver of the automobile, is determined to be approaching the driver-side door of the automobile 110, then the controller 102 can, for example, turn on cabin lights and unlock that door. If the tag 103 is determined to have moved into and rested inside the cabin and in the driver's seat, then the controller 102 can, for example, enable the engine to be started or start the car. Starting the car refers to putting the car in a state where it is ready to drive, which, depending on the type of motor, might not require having a motor running. If the tag 103 is determined to be moving away from the automobile 110 after a car turnoff (e.g., an engine shutdown), then the controller 102 can, for example, ensure that the car doors are locked and engage anti-theft and/or other security measures. Note that a car turnoff is a user-initiated state that might not include, for example, an engine stall or an engine stop in a fuel-saving automotive start-stop system.

Significantly, UWB transceiver systems are also capable of detecting non-transmitting targets in their vicinity. This is accomplished by analyzing changes in received signals that result from the introduction of a non-transmitting target into the transmission environment and the interaction of the non-transmitting target with the transmitted signal from transmitter to receiver-specifically, by altering the channel impulse response (CIR) characteristics for the transmission. For example, introducing an object that reflects a transmission signal into the transmission environment of the transmitter and receiver results in the arrival of multiple copies (at varying strengths) of the signal at the receiver at delays that may be discernable (e.g., from line-of-sight transmissions, other reflections, and/or ambient noise) and that can be used to calculate a distance to the reflecting object and/or determine additional information about the object, such as physical characteristics of the object. Similarly, the introduction of an object that absorbs a transmission signal in the transmission environment can also alter the signals received at the receiver in a discernible way that may be used to calculate a distance to the object and/or determine other information about the object. Note that any particular object may both reflect and absorb portions of transmission signals to varying degrees and some particular objects may have particular reflection/absorption characteristics that allow them to be designated as illumination markers.

Humans make up one type of detection target of particular interest in automotive and other applications. While it may be presumed, in many contexts, that movement of a transmitting tag, such as a key fob, close to and inside a vehicle is indicative of a human user using it, it would also be useful to be able to detect non-transmitting targets such as adults and/or children who are not carrying a transmitting tag. In particular, it would be useful to be able to detect whether children are present in the cabin of the car after the car is parked and the driver has left. Small children are sometimes forgotten in the back seat of an automobile by the driver and this may lead to serious injury or even death, particularly on hot and sunny days, when the temperature inside the car can rapidly rise to intolerable levels.

Figure 2:
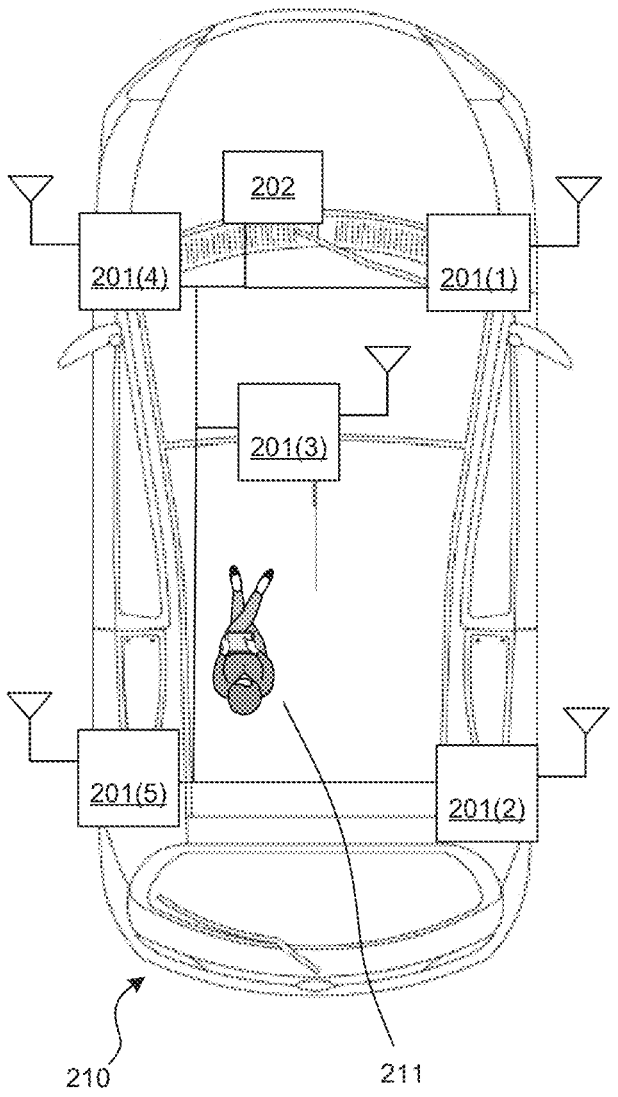
FIG. 2 illustrates the example automotive UWB system of FIG. 1 in an alternative configuration.

FIG. 2 illustrates an example automotive UWB system 200 in accordance with an embodiment of the disclosure. UWB system 200 may be considered a modified version of UWB system 100 of FIG. 1. Elements of system 200 that are similar to elements of system 100 of FIG. 1 and incorporate their above-described features are similarly labeled, but with the initial 1 replaced by 2. In other words, system 200 includes an automobile 210 that includes a plurality of UWB anchor transceivers 201, namely anchors 201(1)-201(5), which are communicatively connected to a controller 202, wherein these elements are similar to, and incorporate the above-described features of, respectively, automobile 110, UWB anchor transceivers 101, and controller 102. UWB system 200 further includes a person 211 in the back seat, who may be, for example, a child or other non-transmitting target of interest. The controller 202 is configured to execute a child-detection process, in conjunction with the anchors 201, to detect a presence of the person 211.

Detecting the presence of the person 211 involves establishing a baseline channel-impulse-response (CIR) profile for the vehicle 210 and subsequently comparing the baseline profile to a current CIR profile to determine if differences between the profiles are the result of a person 211 present in the cabin of the vehicle 210. The controller 202 establishes a CIR profile by triggering a subset of the transmitters of the anchors 201 to transmit a first set of signals, which are received by a subset of receivers of the anchors 201 and analyzed by the controller 202. Note that, as used herein, a subset may refer to a proper subset or a not proper subset.

A CIR profile may be established by, for example, having an initiating anchor, e.g., anchor 201(3), transmitting a first set of signals and responding anchors, e.g., anchors 201(2) and 201(5), receiving the first set of signals. Establishing the CIR profile may include additional transmit/receive cycles involving different transmitter/receiver combinations, such as, for example, also having responding anchor 201(2) transmitting a second set of signals and anchors 201(3) and 201(5) receiving the second set of signals and/or having anchor 201(1) transmitting a third set of signals and anchors 201(2), 201(3), 201(4), and 201(5) receiving the third set of signals. Note that the terms initiating anchor and responding anchor are used in this context to designate an anchor's role in a particular round of CIR-profile establishment and these designations can be different in different rounds, where a round may comprise multiple transmit/receive cycles, as described in additional detail below in reference to FIG. 3.

Note that the above-described first, second, and third sets of signals may be identical to each other or, alternatively, may have variations among them. These sets of signals may be PHY protocol data unit (PPDU) frames as defined, for example, in IEEE standards 802.15.4, 802.15.4z, or future revisions of them. Each PPDU frame typically contains a plurality—e.g., hundreds—of pulses that make up various message components. Also note that, as used herein, receipt or receiving a signal refers to actual processing by a receiver of the received signal for further analysis. In other words, a receiver that is within range of a transmission and is capable of processing the transmission, but which does not process the transmission for whatever reason, would not be considered to have received that transmission.

The controller 202 may be triggered to establish a baseline CIR profile, for example, as part of an initial factory or vehicle-dealer setup, at any time seats are repositioned, in response to an unlocking or turning on of the vehicle, at predetermined periodic or intermittent intervals, or in response to any suitable trigger. A calibration of the anchors 201 to establish, for example, phase, timing, or distance parameters, may be performed as part of establishing a baseline CIR profile or may be performed separately beforehand. Note that when establishing a new or updated baseline CIR profile, the controller 202 may establish a wholly new CIR profile based only on an instant set of transmissions and receptions or, alternatively, may also take into account any previously established baseline CIR profile or profiles.

The controller 202 may subsequently establish a current CIR profile—to, for example, determine the presence of a person 211—in response to a suitable trigger such as, for example, one or more of: an engine shut-off, a parking of the car, a locking of doors, a departure of the driver from the vehicle, and a periodic or intermittent trigger signal. Establishing a current CIR profile may be performed in any of the ways described above in reference to establishing a baseline CIR profile. Namely, one or more sets of signals—e.g., PPDU data frames—may be transmitted from one or more sets of transmitters of the anchors whose receipts at one or more sets of receivers are analyzed by the controller.

Using a set of three or more anchors 201 in order to detect a person 211 may be referred to as multi-static sensing, as distinguished from bi-static sensing. Since the relative locations of the anchors 201 are fixed, establishing the baseline CIR profile provides useful phase and signal information and, furthermore, plural sets of the anchors 201 may be operated as phased arrays. The controller 202 may analyze the received raw data directly or may process it to obtain and analyze, for example, range, frequency, and/or phase information. The obtaining and analysis of the data may be performed using predetermined algorithms, dynamic algorithms, and/or machine-learning models.

Figures 3, 4:
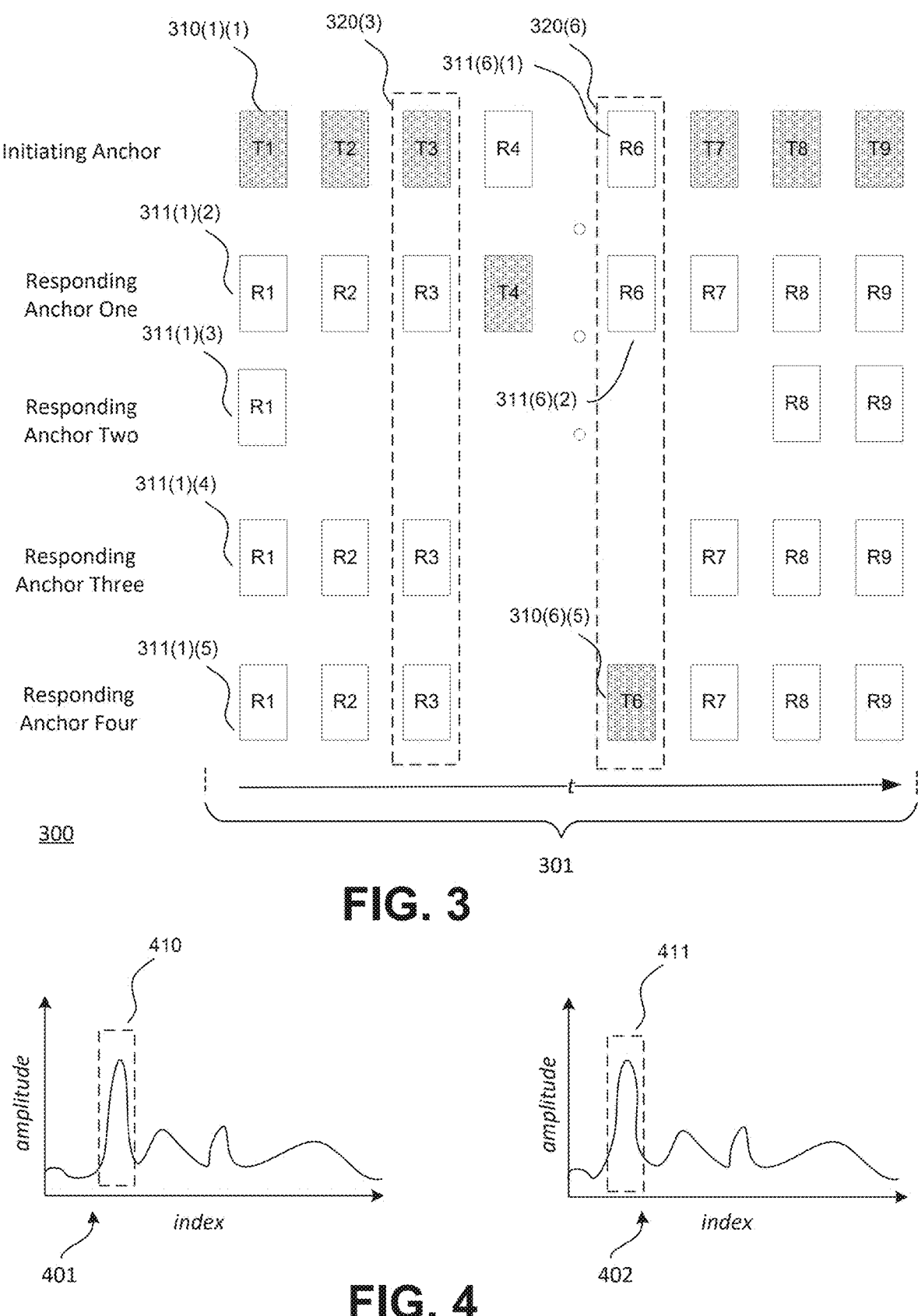
FIG. 3 shows a simplified illustration of an example round of several cycles of frame transmission and receipt for establishing a channel impulse response (CIR) profile by the UWB system of FIG. 2.
FIG. 4 shows an illustration of an example CIR profile for the UWB system of FIG. 2.

FIG. 3 shows a simplified illustration 300 of an example round 301 of several cycles 320 of frame transmission and receipt for establishing a CIR profile by, for example, the UWB system 200 of FIG. 2. The profile-establishing round 301 starts with an initiating anchor 201 (e.g., anchor 201(1)) transmitting a first set of signals (e.g., a PPDU frame) 310(1)(1), where the parentheticals in the label indicate the cycle number and the anchor number, also shown as T1 in the illustration. The first set of signals 310(1)(1) is then received by a set of responding anchors 201 (e.g., anchors 201(2), 201(3), 201(4), and 201(5)) as received sets of signals 311 (e.g., received frames 311(1)(2), 311(1)(3), 311(1)(4), and 311(1)(5), respectively, where the parentheticals in the label similarly indicate the cycle number and the anchor number), also shown as R1. As noted above, to facilitate understanding of the illustration, transmission frames 310 are labeled with a T prefix and an ordinal suffix and are shaded (e.g., T1, T2, etc.), while received frames 311 are labeled with an R prefix and an ordinal suffix (e.g., R1, R2, etc.).

One or more subsequent cycles 320, separated by corresponding intervals, may have the initiating anchor (e.g., anchor 201(1)) again transmitting a set of signals 310 received as corresponding sets of signals 311 at a set of responding anchors (e.g., anchors 201(2), 201(4), and 201(5)), as seen, for example, in cycle 320(3). Importantly, in one or more subsequent cycles 320 of the round 301, one or more of the responding anchors may transmit a set of signals 310 received as corresponding sets of signals 311 at a set of other anchors including the initiating anchor. For example, as shown in illustration 300, in the sixth cycle 320(6), the fourth responding anchor (e.g., anchor 201(5)) transmits a set of signals 310(6)(5), which is received as received sets of signals 311(6)(1) and 311(6)(2) by, respectively, the initiating anchor (e.g., anchor 201(1)) and the first responding anchor (e.g., anchor 201(2)). In some implementations, the first and/or last transmitted sets of signals (e.g., T1 and T9) may be synchronization frames (e.g., an SP3 type PPDU frame), while the intermediate transmitted sets of signals (e.g., T2-T8) may be data frames (e.g., SP0 type PPDU frames).

FIG. 4 shows example graphs illustrating aspects of corresponding CIR profiles. For example, graph 401 may correspond to a baseline CIR profile generated by a first round 301, while graph 402 may correspond to a first current CIR profile generated by a subsequent round 301. As can be seen, the highest peak in the CIR profile has shifted from zone 410 in graph 401 to zone 411 in graph 402, which corresponds to a change in the transmission environment of the communicating anchors. The controller 202 may be able to analyze the CIR profiles to determine that the environmental change has likely been caused by the presence of a person in the transmission environment, who may be referred to as a candidate person. It should be noted that the analyzed differences are not limited to shifts in peaks in the CIR profile, which are used here only as an example.

Returning to UWB system 200 of FIG. 2, following a procedure as described above including comparing a baseline CIR profile with a first current CIR profile to determine the presence of a candidate person, further steps may be undertaken to verify whether the candidate person is indeed a person. The controller 202 can analyze the CIR profile data (e.g., as represented by the graphs 401 and 402 of FIG. 4) to determine a location for the candidate person. The controller 202 can then trigger a new, focused, communication round among a set of the anchors 201 to focus on the determined location and analyze the resultant CIR information to extract vital-signs information, if present, to determine whether a person is indeed present in the determined candidate-person location.

A set of anchors 201 may focus on the candidate-person location by having a plurality of anchors "illuminate" that location by, for example, varying the timing and/or phase of each respective set of transmitted signals based on the distance from the transmitting anchor to the location so that the signals arrive in synch and interfere constructively to amplify the signals at the candidate-person location. Other phased array beamforming techniques may also be used to focus on the target location. The set of signals of the new communication round may also be varied from those of the previous rounds by having more-narrowly shaped pulses, which can help discern smaller variations in reflections over time at the target location.

Reflections of the transmitted signals received by one or more receivers in the plurality of anchors 201 are then analyzed by the controller 202 to detect, for example, the presence of breathing, indicated by regular expansion and contraction of the torso of the located person. The received signals may even indicate a heartbeat, discernible from regular pulsations affecting the skin of the located person. Example methods for extracting vital signs information from received UWB signals are described in Dingyang Wang et al., "Experimental Comparison of IR-UWB Radar and FMCW Radar for Vital Signs," Sensors (Basel, Switzerland) 20 (2020), incorporated herein by reference in its entirety.

The received sets of signals may also be differently processed—by, for example, modifying the operating parameters of the receivers—to focus on the target location. For example, for vital-signs analysis, time-aperture zoom-in may be used to focus on a time window including portions of the received signal corresponding to the target location. Other phased array beamforming techniques may also be used to focus on the target location.

The data of either or both of the above-described current CIR profile and the focused communication round may be further analyzed to determine whether the candidate person 211 is a child rather than an adult. Data analysis may provide an indication of the size of the candidate person 211, which can be used to distinguish children from adults, as the former are generally smaller. The target location may also be used to distinguish children from adults as the former are more likely to be in a rear seat. Additionally, the determined vital-signs data can also be used to distinguish children from adults as the former tend to have respiration rates and heart rates in higher ranges. Notably, however, the above are merely factors for consideration and might not be dispositive determinants since sizes, heart rates, and breathing rates vary as children may move about the cabin. Relatedly, as multiple communication rounds 301 may be performed, analysis of the multiple rounds can provide useful information about any movement in the cabin of the candidate person 211.

If, following the above-described procedures, the controller 202 determines that a child is present without the driver in a parked vehicle, then the controller 202 can take one or more alert actions. The controller 202 may send a notification alert to the driver using a cellular, or other wireless, network. The controller 202 may send a notification alert to first responders providing notification of a child alone in a vehicle. The controller 202 may also trigger other alert actions, such as, for example, flashing the headlights or honking the horn of the automobile 210.

The automobile 210 may include various other sensor systems (not shown) capable of providing information regarding the cabin environment and operating when the car is in a turned-on mode. For example, the automobile 210 may include a cabin camera system and/or a cabin microphone system to allow driver interaction with automobile functions (e.g., information and entertainment systems) or to provide driver assistance (e.g., driver alertness monitoring). When the automobile 210 is in a turned-off mode, these additional systems may be in a non-operating mode in order to conserve power (e.g., limited battery power). Note that non-operating modes include complete power off and minimal-power sleep modes. The controller 202 and at least a subset of the anchors 201 may perform the processes described herein while these other cabin sensor systems are in a non-operating mode Embodiments have been described herein where the controller 202 is implemented as a device separate from the anchors 201. In some alternative embodiments, the controller is implemented in a single device together with one of the anchors 201. In some other alternative embodiments, the controller is distributed among two or more anchors 201. These alternative embodiments may provide benefits such as cost savings and/or improved performance.

Embodiments have been described where the UWB-based detection system is implemented in an automobile. Alternative embodiments, however, are not so limited and may be implemented in other settings, both in other types of vehicles and also in non-vehicular settings, such as, for example, in rooms in buildings.

Embodiments have been described where the non-transmitting targets are people, particularly children. Alternative embodiments, however, may be directed to non-human non-transmitting targets such as, for example, pets, other animals, or inanimate objects.

FIG. 5 shows a flowchart for an example procedure 500 for the UWB system 200 of FIG. 2, in accordance with an embodiment of the disclosure. The procedure starts with the controller triggering a subset of the transmitters of a plurality of transceivers to transmit a first set of signals for receipt by a subset of the receivers (step 501). The procedure continues with the controller establishing a baseline channel impulse response (CIR) profile for the vehicle based on the receipt of the first set of signals (step 502). The controller subsequently triggers the subset of the transmitters of the plurality of transceivers to transmit a second set of signals for receipt by the subset of the receivers (step 503). The controller establishes a first current CIR profile for the vehicle based on the receipt of the second set of signals (step 504). The procedure 500 terminates with the controller detecting the person inside the vehicle based on the baseline CIR profile and the first current CIR profile (step 505).

FIG. 6 shows a flowchart for an example procedure 600 for a processor controlling a plurality of wide-band transceivers, wherein each transceiver comprises a transmitter and a receiver, in accordance with an embodiment of the disclosure. The procedure 600 starts with the processor triggering a subset of the transmitters of the plurality of transceivers to transmit a first set of signals for receipt by a subset of the receivers of the plurality of transceivers (step 601). The processor then establishes a baseline channel impulse response (CIR) profile based on the receipt of the first set of signals (step 602). Subsequently, the processor triggers the subset of the transmitters of the plurality of transceivers to transmit a second set of signals for receipt by the subset of the receivers of the plurality of transceivers (step 603). Next, the processor establishes a first current CIR profile based on the receipt of the second set of signals (step 604). And the procedure 600 terminates with detecting a non-transmitting target based on the baseline CIR profile and the first current CIR profile (step 605).

While embodiments have been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations.

Examples can include subject matter such as a method, means for performing acts or blocks of the method, at least one machine-readable medium including instructions that, when performed by a machine cause the machine to perform acts of the method or of an apparatus or system for detecting a non-transmitting target according to embodiments and examples described herein.

Example 1 is a method for detecting a person inside a vehicle, wherein the vehicle includes a plurality of wide-band transceivers each having a transmitter and a receiver and a controller circuitry communicatively connected to each of the transceivers. The method includes the control circuitry: triggering a subset of the transmitters of the plurality of transceivers to transmit a first set of signals for receipt by a subset of the receivers; establishing a baseline channel impulse response (CIR) profile for the vehicle based on the receipt of the first set of signals; subsequently triggering the subset of the transmitters of the plurality of transceivers to transmit a second set of signals for receipt by the subset of the receivers; establishing a first current CIR profile for the vehicle based on the receipt of the second set of signals; and detecting the person inside the vehicle based on the baseline CIR profile and the first current CIR profile.

Example 2 includes the subject matter of example 1, including or omitting optional elements, wherein detecting the person includes: determining a presence of a candidate person based on comparing the baseline CIR profile and the first current CIR; determining a location of the candidate person; triggering a second subset of the transmitters of the plurality of transceivers to transmit a third set of signals for receipt by a second subset of the receivers of the plurality of transceivers, wherein the third set of signals is shaped to focus on the determined location; extracting vital-signs information based on the receipt of the third set of signals; and determining that the candidate person is the person based on the extracted vital-signs information.

Example 3 includes the subject matter of any of examples 1-2, including or omitting optional elements, wherein detecting the person includes: determining a presence of a candidate person based on comparing the baseline CIR profile and the first current CIR; determining a location of the candidate person; triggering a second subset of the transmitters of the plurality of transceivers to transmit a third set of signals for receipt by a second subset of the receivers, the triggering comprising modifying operating parameters of the second subset of the receivers to focus on the determined location; extracting vital-signs information based on the receipt of the third set of signals; and determining that the candidate person is the person based on the extracted vital-signs information.

Example 4 includes the subject matter of example 3, including or omitting optional elements, wherein the modifying operating parameters includes focusing on a corresponding time window of interest in the received second set of signals.

Example 5 includes the subject matter of example 3, including or omitting optional elements, wherein the triggering of the second subset of the transmitters comprises using a pulse shape for the third set of signals that is different from a pulse shape for the second set of signals.

Example 6 includes the subject matter of any of examples 1-5, including or omitting optional elements, wherein: the plurality of transceivers comprises at least three transceivers each anchored in a respective location in the vehicle to form a multi-static array; the first and second sets of signals are impulse-radio ultra-wide-band (IR-UWB) signals; the method further includes the controller circuitry and the plurality of transceivers: determining a location and an identification of a transmitting vehicle-key device; and allowing and denying access to vehicle functions based on the determined location and identification of the transmitting vehicle-key device.

Example 7 includes the subject matter of any of examples 1-6, including or omitting optional elements, wherein: the triggering step is initiated in response to one of a car unlock, car start, seat adjustment, car turnoff, and car lock event; and the subsequent triggering is initiated in response to one of a car turnoff, car lock, and car park event.

Example 8 includes the subject matter of any of examples 1-7, including or omitting optional elements, further including the controller circuitry: triggering a different subset of the transmitters of the plurality of transceivers to transmit a third set of signals for receipt by a different subset of the receivers of the plurality of transceivers; establishing a different baseline CIR profile for the vehicle based on the receipt of the third set of signals; subsequently triggering the different subset of the transmitters to transmit a fourth set of signals for receipt by the different subset of the receivers; and establishing a different current CIR profile for the vehicle based on the receipt of the fourth set of signals, wherein detecting the person inside the vehicle is further based on the different baseline CIR profile and the different current CIR profile.

Example 9 includes the subject matter of any of examples 1-8, including or omitting optional elements, wherein: the vehicle further comprises a set of cabin sensor systems comprising at least one of a camera system and a microphone system, the cabin sensor systems configured to be in one of an operating mode and a non-operating mode; and the controller circuitry performs the method while the cabin sensor systems are in the non-operating mode.

Example 10 is a detection system including: a plurality of wide-band transceivers, wherein each transceiver comprises a transmitter and a receiver; and a controller circuitry communicatively connected to each of the transceivers, wherein the controller circuitry is configured to: trigger a subset of the transmitters of the plurality of transceivers to transmit a first set of signals for receipt by a subset of the receivers of the plurality of transceivers; establish a baseline channel impulse response (CIR) profile for the system based on the receipt of the first set of signals; subsequently trigger the subset of the transmitters of the plurality of transceivers to transmit a second set of signals for receipt by the subset of the receivers of the plurality of transceivers; establish a first current CIR profile for the system based on the receipt of the second set of signals; and detect a non-transmitting target in proximity to the system based on the baseline CIR profile and the first current CIR profile.

Example 11 includes the subject matter of example 10, including or omitting optional elements, wherein the controller circuitry is further configured to: determine a presence of a candidate target based on comparing the baseline CIR profile and the first current CIR; determine a location of the candidate target; trigger a second subset of the transmitters of the plurality of transceivers to transmit a third set of signals for receipt by a second subset of the receivers, wherein the third set of signals is shaped to focus on the determined location; perform an analysis of the received third set of signals; and validate the candidate target as a valid target based on the analysis.

Example 12 includes the subject matter of example 11, including or omitting optional elements, wherein the target is a person and the analysis comprises extracting vital-signs information.

Example 13 includes the subject matter of any of examples 10-12, including or omitting optional elements, wherein the controller circuitry is further configured to: determine a presence of a candidate target based on comparing the baseline CIR profile and the first current CIR; determine a location of the candidate target; trigger a second subset of the transmitters of the plurality of transceivers to transmit a third set of signals for receipt by a second subset of the receivers; modify operating parameters of the second subset of the receivers to focus on the determined location; perform an analysis of the received third set of signals; and validate the candidate target as a valid target based on the analysis.

Example 14 includes the subject matter of example 13, including or omitting optional elements, wherein the target is a person and the analysis comprises extracting vital-signs information.

Example 15 includes the subject matter of example 13, including or omitting optional elements, wherein the control circuitry is configured to modify operating parameters of the second subset of the receivers to focus on the determined location by focusing on a corresponding time window of interest in the received second set of signals.

Example 16 includes the subject matter of any of examples 10-15, including or omitting optional elements, wherein the plurality of transceivers comprises at least three transceivers each located in a respective different location to form a multi-static array.

Example 17 includes the subject matter of example 16, including or omitting optional elements, wherein the controller circuitry is co-located with a first transceiver of the plurality of transceivers.

Example 18 includes the subject matter of example 16, including or omitting optional elements, wherein the controller circuitry is in a controller device located in a corresponding location different from the locations of the plurality of transceivers.

Example 19 includes the subject matter of any of examples 10-18, including or omitting optional elements, wherein the first and second sets of signals are impulse-radio ultra-wide-band (IR-UWB) signals.

Example 20 includes the subject matter of any of examples 10-19, including or omitting optional elements, wherein the controller circuitry is further configured to: trigger a different subset of the transmitters of the plurality of transceivers to transmit a third set of signals for receipt by a different subset of the receivers of the plurality of transceivers; establish a different baseline CIR profile for the system based on the receipt of the third set of signals; subsequently trigger the different subset of the transmitters to transmit a fourth set of signals for receipt by the different subset of the receivers; and establish a different current CIR profile for the system based on the receipt of the fourth set of signals, wherein detecting the target is further based on the different baseline CIR profile and the different current CIR profile.

Example 21 is a processor-implemented method for a plurality of wide-band transceivers, wherein each transceiver includes a transmitter and a receiver, the method includes: triggering a subset of the transmitters of the plurality of transceivers to transmit a first set of signals for receipt by a subset of the receivers of the plurality of transceivers; establishing a baseline channel impulse response (CIR) profile based on the receipt of the first set of signals; subsequently triggering the subset of the transmitters of the plurality of transceivers to transmit a second set of signals for receipt by the subset of the receivers of the plurality of transceivers; establishing a first current CIR profile based on the receipt of the second set of signals; and detecting a non-transmitting target based on the baseline CIR profile and the first current CIR profile.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale.

As utilized herein, terms "module", "component," "system," "circuit," "circuitry," "element," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

What is claimed is:

1. A method for detecting a person inside a vehicle, wherein:

the vehicle comprises:

a plurality of wide-band transceivers each comprising a transmitter and a receiver;

a controller circuitry communicatively connected to each of the transceivers; and the method comprises the control circuitry:

triggering a subset of the transmitters of the plurality of transceivers to transmit a first set of signals for receipt by a subset of the receivers;

establishing a baseline channel impulse response (CIR) profile for the vehicle based on the receipt of the first set of signals;

subsequently triggering the subset of the transmitters of the plurality of transceivers to transmit a second set of signals for receipt by the subset of the receivers;

establishing a first current CIR profile for the vehicle based on the receipt of the second set of signals; and detecting the person inside the vehicle based on the baseline CIR profile and the first current CIR profile, wherein detecting the person comprises triggering a second subset of the transmitters of the plurality of transceivers, to transmit a third set of signals for receipt by a second subset of the receivers of the plurality of transceivers, to focus on a determined location.

2. The method of claim 1, wherein:

detecting the person comprises:

determining a presence of a candidate person based on comparing the baseline CIR profile and the first current CIR;

determining the location of the candidate person;

extracting vital-signs information based on the receipt of the third set of signals; and determining that the candidate person is the person based on the extracted vital-signs information; and the third set of signals is shaped to focus on the determined location.

3. The method of claim 1, wherein:

detecting the person comprises:

determining a presence of a candidate person based on comparing the baseline CIR profile and the first current CIR;

determining the location of the candidate person;

extracting vital-signs information based on the receipt of the third set of signals; and determining that the candidate person is the person based on the extracted vital-signs information; and triggering the second set of the transmitters of the plurality of transceivers comprises modifying operating parameters of the second subset of the receivers to focus on the determined location.

4. The method of claim 3, wherein the modifying operating parameters comprises at least one of:

focusing on a corresponding time window of interest in the received second set of signals; and adjusting a combination of received signals across the plurality of transceivers.

5. The method of claim 3, wherein the triggering of the second subset of the transmitters comprises using a pulse shape for the third set of signals that is different from a pulse shape for the second set of signals.

6. The method of claim 1, wherein:

the plurality of transceivers comprises at least three transceivers each anchored in a respective location in the vehicle to form a multi-static array;

the first and second sets of signals are impulse-radio ultra-wide-band (IR-UWB) signals;

the method further comprises the controller circuitry and the plurality of transceivers:

determining a location and an identification of a transmitting vehicle-key device; and allowing and denying access to vehicle functions based on the determined location and identification of the transmitting vehicle-key device.

7. The method of claim 1, wherein:

the triggering is initiated in response to one of a car unlock, car start, seat adjustment, car turnoff, and car lock event; and the subsequent triggering is initiated in response to one of a car turnoff, car lock, and car park event.

8. The method of claim 1, further comprising the controller circuitry:

US 12,625,244 B2

15 triggering a different subset of the transmitters of the plurality of transceivers to transmit a fourth set of signals for receipt by a different subset of the receivers of the plurality of transceivers;

establishing a different baseline CIR profile for the vehicle based on the receipt of the third set of signals;

subsequently triggering the different subset of the transmitters to transmit a fifth set of signals for receipt by the different subset of the receivers; and establishing a different current CIR profile for the vehicle based on the receipt of the fifth set of signals, wherein detecting the person inside the vehicle is further based on the different baseline CIR profile and the different current CIR profile.

9. The method of claim 1, wherein:

the vehicle further comprises a set of cabin sensor systems comprising at least one of a camera system and a microphone system, the cabin sensor systems configured to be in one of an operating mode and a non-operating mode; and the controller circuitry performs the method while the cabin sensor systems are in the non-operating mode.

10. A detection system comprising:

a plurality of wide-band transceivers, wherein each transceiver comprises a transmitter and a receiver; and a controller circuitry communicatively connected to each of the transceivers, wherein the controller circuitry is configured to:

trigger a subset of the transmitters of the plurality of transceivers to transmit a first set of signals for receipt by a subset of the receivers of the plurality of transceivers;

establish a baseline channel impulse response (CIR) profile for the system based on the receipt of the first set of signals;

subsequently trigger the subset of the transmitters of the plurality of transceivers to transmit a second set of signals for receipt by the subset of the receivers of the plurality of transceivers;

establish a first current CIR profile for the system based on the receipt of the second set of signals;

detect a non-transmitting target in proximity to the system based on the baseline CIR profile and the first current CIR profile; and trigger a second subset of the transmitters of the plurality of transceivers to transmit a third set of signals for receipt by a second subset of the receivers, to focus on a determined location.

11. The detection system of claim 10, wherein:

the controller circuitry is further configured to:

determine a presence of a candidate target based on comparing the baseline CIR profile and the first current CIR;

determine the location of the candidate target;

perform an analysis of the received third set of signals; and validate the candidate target as a valid target based on the analysis; and the third set of signals is shaped to focus on the determined location.

12. The detection system of claim 11, wherein:

the target is a person; and the analysis comprises extracting vital-signs information.

13. The detection system of claim 10, wherein the controller circuitry is further configured to:

16 determine a presence of a candidate target based on comparing the baseline CIR profile and the first current CIR;

determine the location of the candidate target;

modify operating parameters of the second subset of the receivers to focus on the determined location;

perform an analysis of the received third set of signals; and validate the candidate target as a valid target based on the analysis.

14. The detection system of claim 13, wherein:

the target is a person; and the analysis comprises extracting vital-signs information.

15. The detection system of claim 13, wherein the control circuitry is configured to modify operating parameters of the second subset of the receivers to focus on the determined location by focusing on a corresponding time window of interest in the received second set of signals.

16. The detection system of claim 10, wherein the plurality of transceivers comprises at least three transceivers each located in a respective different location to form a multi-static array.

17. The detection system of claim 16, wherein the controller circuitry is co-located with a first transceiver of the plurality of transceivers.

18. The detection system of claim 16, wherein the controller circuitry is in a controller device located in a corresponding location different from the locations of the plurality of transceivers.

19. The detection system of claim 10, wherein the first and second sets of signals are impulse-radio ultra-wide-band (IR-UWB) signals.

20. The detection system of claim 10, wherein the controller circuitry is further configured to:

trigger a different subset of the transmitters of the plurality of transceivers to transmit a fourth set of signals for receipt by a different subset of the receivers of the plurality of transceivers;

establish a different baseline CIR profile for the system based on the receipt of the fourth set of signals;

subsequently trigger the different subset of the transmitters to transmit a fifth set of signals for receipt by the different subset of the receivers; and establish a different current CIR profile for the system based on the receipt of the fifth set of signals, wherein detecting the target is further based on the different baseline CIR profile and the different current CIR profile.

21. A processor-implemented method for a plurality of wide-band transceivers, wherein each transceiver comprises a transmitter and a receiver, the method comprising:

triggering a subset of the transmitters of the plurality of transceivers to transmit a first set of signals for receipt by a subset of the receivers of the plurality of transceivers;

establishing a baseline channel impulse response (CIR) profile based on the receipt of the first set of signals;

subsequently triggering the subset of the transmitters of the plurality of transceivers to transmit a second set of signals for receipt by the subset of the receivers of the plurality of transceivers;

establishing a first current CIR profile based on the receipt of the second set of signals; and detecting a non-transmitting target based on the baseline CIR profile and the first current CIR profile, wherein detecting the non-transmitting target comprises triggering a second subset of the transmitters of the plurality of transceivers, to transmit a third set of signals for receipt by a second subset of the receivers of the plurality of transceivers, to focus on a determined location.

* * * * *